Feb. 9, 1932.　　　B. C. SKINNER　　　1,844,264
FRUIT CLEANING MACHINE
Filed March 21, 1929　　2 Sheets-Sheet 1

INVENTOR
Bronson C. Skinner
BY
J. S. Wooster
ATTORNEY

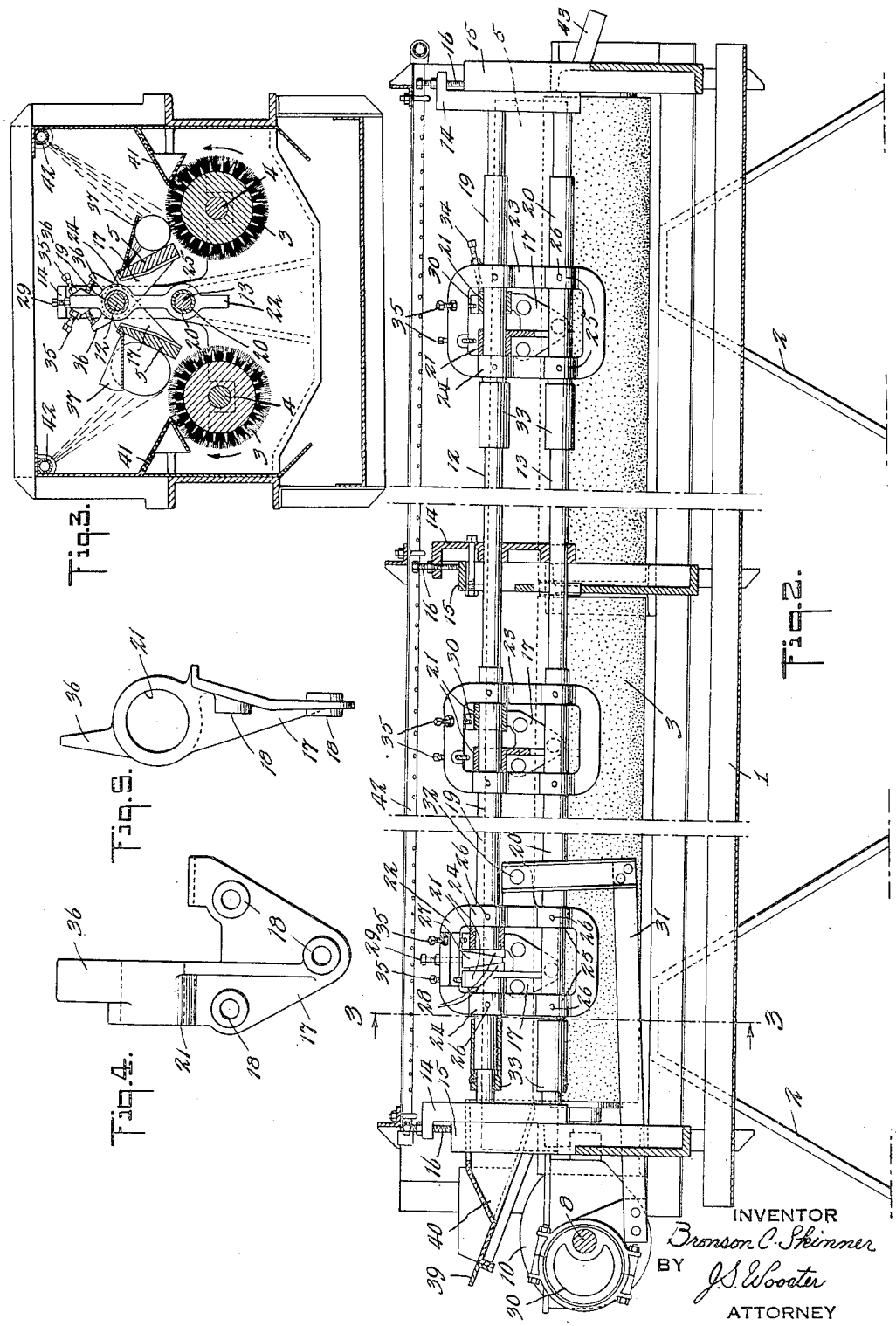

Patented Feb. 9, 1932

1,844,264

UNITED STATES PATENT OFFICE

BRONSON C. SKINNER, OF DUNEDIN, FLORIDA, ASSIGNOR, BY MESNE ASSIGNMENTS, TO FLORIDA CITRUS MACHINERY COMPANY, OF DUNEDIN, FLORIDA, A CORPORATION OF FLORIDA

FRUIT CLEANING MACHINE

Application filed March 21, 1929. Serial No. 348,838.

This invention relates to machines for cleaning citrus fruit and the like, and has for its object to provide an improved machine adapted for either wet or dry cleaning, which is readily accessible for adjustment or replacement of parts, and is capable of cleaning fruit more thoroughly and rapidly than heretofore without liability of damaging the fruit.

The machine preferably comprises a rotary brush and an adjacent inclined rubbing board forming a runway for the fruit. A feature of the invention resides in reciprocating the rubbing board in a straight line parallel to the axis of the brush while rotating the brush toward the rubbing board.

These combined motions result in constantly changing the axis about which the fruit rotates as it moves through the machine so that it is cleaned thoroughly on all sides. The straight-line motion of the rubbing board maintains a predetermined uniform spacing between the brush and rubbing board regardless of the stroke of the latter, preventing the fruit from being pinched by the action of the brush turning against the rubbing board or drawn between the two and destroyed.

Heretofore, a common method of cleaning fruit has been by passage through a runway formed by adjacent cylindrical or spiral scrubbing brushes rotated in the same direction. This method has proved objectionable because the brushes tend to rotate the fruit about one axis, leaving a black spot on the stem and blossom ends of flat fruit or on any two opposite spots on round fruit.

This difficulty was largely overcome by the cleaner disclosed in L. B. Skinner Patent #967,680, issued August 16, 1910, employing a rotary cylindrical brush and a reciprocating flat brush which convey the fruit forward while constantly changing the axis of rotation, but that machine has certain other disadvantages which it is my object to eliminate. In the first place, the flat brush is suspended on pivoted hangers which swing in the arc of a circle and lift the flat brush away from the fruit, causing small or soft fruit to be pinched between the two brushes and sometimes drawn through and completely destroyed. This has made it especially difficult for the machine to handle tangerines safely. Even with large fruit it is necessary to limit the stroke of the flat brush to prevent pinching since the greater the stroke the greater will be the separation from the fruit. The overhead shafting is also objectionable because it occupies considerable space and renders the machine inaccessible especially when in motion.

These objections are overcome in the present invention by providing a rubbing board or flat brush which is reciprocated in a straight line parallel to the axis of the rotary brush, maintaining the rubbing board uniformly close to the fruit regardless of its length of travel. This enables the stroke of the rubbing board to be increased, propelling and turning the fruit more rapidly than heretofore without liability of damage. A further advantage of this construction is that it eliminates all overhead shafting, making the machine compact and readily accessible for replacement and adjustment of parts.

The machine which I shall describe to illustrate the invention has two spaced rotary brushes with their axes parallel and two inclined rubbing boards, forming two runways. The rubbing boards are both pivoted on bearings which slide on a common shaft intermediate and parallel to the brushes. This shaft is adjustable vertically, permitting the rubbing boards to be moved toward and away from the brushes to give the desired amount of clearance for free operation. Improved means are also provided for adjusting the angler inclination of the rubbing boards with respect to the brushes to vary the pressure on the fruit. Both adjustments may be made quickly and the machine changed from one setting to another without special knowledge or manipulation.

An important feature of the invention is the novel means employed for reciprocating the rubbing boards in unison. To provide increased strength and rigidity, and ample bearing surface, a second shaft is mounted adjacent and parallel to the shaft which supports the rubbing boards. Spaced yokes are slidably mounted between both shafts, straddling and confining the pivots which support the rubbing boards. Reciprocating motion is imparted to the yoke at one end of the machine, preferably the receiving end, causing this yoke to move back and forth on both shafts and communicate the reciprocating motion to both rubbing boards. The driving yoke is preferably provided with an adjusting device which forces the adjacent pivots of the rubbing board firmly against the opposite branches of the yoke, causing the pivots and consequently the two rubbing boards to move in unison with the yoke. Other adjusting devices are provided on other yokes where necessary to take up slack between the yoke and pivots of the rubbing boards.

In carrying out the invention, various novel combinations and sub-combinations in the reciprocating, supporting and adjusting mechanisms have been used, all of which will be described in detail in connection with the accompanying drawings in which similar reference characters designate corresponding parts in the several views, and in which:

Fig. 2 is a longitudinal section illustrating the mounting of the rubbing boards and the reciprocating mechanisms;

Fig. 3 is a transverse section taken on the line 3—3 of Fig. 2, illustrating the angular adjustment of the rubbing boards with respect to the rotary brushes; and Figs. 4 and 5 are enlarged detail views of the hangers pivotally supporting the rubbing boards.

Figure 1:
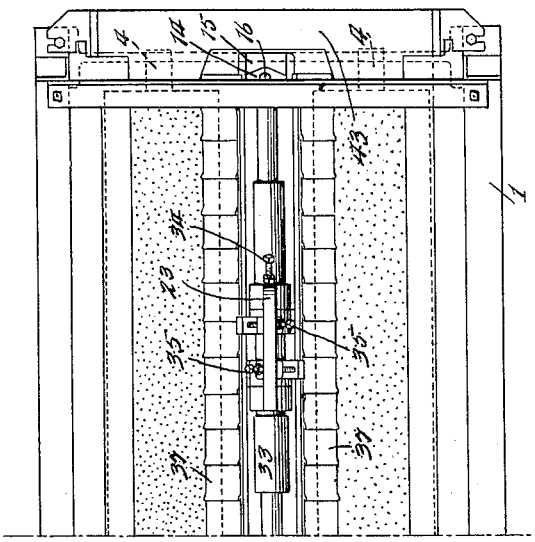
Fig. 1 is a plan view of a machine embodying the invention.
Figure 1:
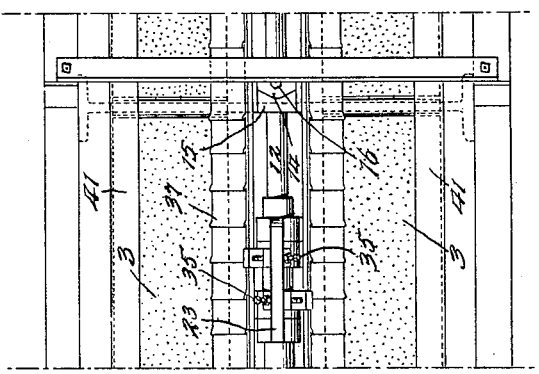
Figure 1:
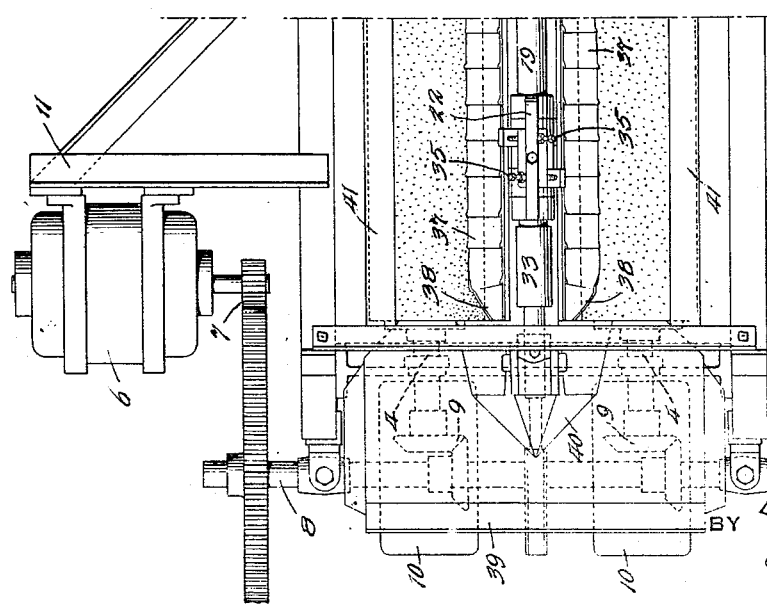

In the drawings, the frame 1 is supported on legs 2, and is preferably inclined downwardly from the receiving end of the machine to the delivery end as shown in Fig. 2.

The cylindrical brushes or cleaning rolls 3 are spaced apart in parallel relation and are provided with shafts 4 journaled in suitable bearings in the ends of the frame 1.

The rubbing boards 5 are mounted for endwise reciprocation in the space between the brushes 3 in a manner hereinafter described. These boards are coextensive with the brushes 3 and have their lower edges adjacent and parallel to the surfaces of said brushes. The outer surfaces of the rubbing boards are preferably flat and covered with cotton belt or other suitable cloth drawn tightly over the surfaces. These covers take the wear of the fruit better than bristles which tend to soften and flatten out, and are easily replaced.

The brushes 3 are rotated by motor 6 through reduction gears 7, shaft 8 and beveled gears 9 preferably enclosed within guard casings 10. In the construction illustrated the motor is mounted on a bracket 11 secured to the frame of the machine. The brushes 3 rotate in the direction of the arrows in Fig. 3.

The support for the rubbing boards includes longitudinal shafts 12 and 13 which are mounted one above the other midway between the brushes 3 and extend the full length of the machine. These shafts are supported at intervals in castings 14 which, in turn, are adjustably supported by uprights 15 bolted or otherwise attached to the main crossbars of the machine. The castings 14 are adjustable vertically by means of adjusting screws 16 turning against the uprights 15. The vertical adjustment of the castings 14 and shafts 12 and 13 adjusts the vertical position of the rubbing boards 5 with respect to the brushes 3.

The rubbing boards 5 are attached at intervals to hangers 17, preferably by bolts extending through cores 18 in the hangers. Sleeves or tubes 19 and 20 are slidably mounted on the shafts 12 and 13, respectively. The hangers 17 have collars 21 which are slipped over the upper sleeves 19 and are free to pivot or swivel upon the sleeves 19. Since both of the rubbing boards 5 are hung from the top shaft 12 and face in opposite directions, it will be seen that the positions of the hangers 17 of the respective rubbing boards are reversed on the sleeves 19 so that the depending ends of each pair of opposed hangers partly overlap and their respective collars 21 are spaced apart slightly on the sleeves 19 as shown in Figs. 2 and 3.

The mechanisms for reciprocating and for angularly adjusting the rubbing boards include yoke 22 and yokes 23 which are mounted on sleeves 19 and 20 between the two shafts, as shown in Figs. 2 and 3. These yokes straddle the respective pairs of collars 21 and have spaced pairs of bushings 24 and 25 secured to sleeves 19 and 20, respectively, by means of set screws 26. The yoke 22, which may be called the driving yoke, is provided with a forked wedge 27 which straddles the sleeve 19 between two beveled washers 28. The wedge 27 is adjustable vertically by means of adjusting screw 29 which forces the wedge down between the washers 28, separating the two hangers 17 until their collars 21 are pressed firmly against the opposite bushings 24 of the yoke 22.

Reciprocating motion is imparted to the rubbing boards by means of an eccentric 30 mounted on shaft 8 and having a lever 31 connected at 32 to the yoke 22. The reciprocating motion of the yoke 22 is imparted to the hangers 17 and thence to the rubbing boards, the sleeves 19 and 20 sliding upon the shafts 12 and 13. To provide strength and rigidity and ample wearing surface the same sleeves 19 and 20 which support yoke 22 extend beyond and also support the first yoke 23. The sleeves 19 and 20 at the opposite end of the machine, as well as any other intermediate sleeves which may be used, may be considerably shorter. The bearing surfaces between the shafts and sleeves may be lubricated in any suitable manner as by means of alemite grease cups, and shields 33 are preferably mounted on the shafts covering the ends of the sleeves to prevent water from entering between the sleeves and the shafts and washing out the grease.

The reciprocating motion of the rubbing boards would cause the hangers 17 at the delivery end of the machine to knock against their yoke 23 if there were any lost motion between them, and to prevent this an adjusting screw 34 is provided in the yoke acting on one of the hangers to take up the slack. Similar adjusting screws would be provided for any other intermediate yokes 23 mounted on independent sleeves 19 and 20 not connected with the driving yoke 22.

Angular adjustment of the rubbing boards 5 is accomplished by means of adjusting screws 35 threaded through opposite sides of the yokes 22 and 23 and contacting with projections 36 formed on the upper ends of the hangers 17. By adjusting the screws 35 the rubbing boards may be set at any angle desired.

Separate strips of material 37, such as canvas, extend substantially the full length of the rubbing boards and are secured to the upper edges thereof so that they hang down loosely over the fruit as shown in Figs. 1 and 3. The strips 37 are folded transversely to provide spaced ruffles, with the folds lying inwardly and pointing toward the delivery end of the machine so that they engage and propel the fruit forward from one fold to the next as the rubbing boards are reciprocated. The lower edges of the strips 37 nearest the receiving end of the machine are folded over at 38 and secured to the upper edges of the rubbing boards to permit the fruit to get underneath the strips.

At the elevated receiving end of the machine a feed runway 39 is provided overlying the gear casings 10 for directing fruit onto the brushes. A flared shield 40 adjacent the center of the runway 39 divides the fruit between the two brushes and also covers the ends of the reciprocating rubbing boards at the farthest point of their forward movement so that the fruit on entering the machine cannot be caught and pinched by the ends of the rubbing boards. Deflector plates 41 are provided at both sides of the machine overhanging the respective brushes 3 to deflect the fruit toward the rubbing boards.

For wet cleaning, sprinkler pipes 42 are mounted at the upper sides of the machine extending the full length of the brushes, and are provided at intervals with small holes in position to direct water against the brushes and fruit. The sprinkler system may be connected to any suitable source of water supply.

In the operation of the machine the fruit are dumped into the feed runway 39 and are deflected by the shield 40 into the troughs formed by the brushes 3 and deflector plates 41. The brushes 3 rotate toward the rubbing boards and carry the fruit beneath the ruffled strips 37 overhanging the rubbing boards. The rotation of the brushes 3 not only brushes the surface of the fruit thereby cleaning it, but also imparts a rotating motion to the fruit. This rotating motion is slow so that the rubbing effect of the brushes is not reduced. The straight-line reciprocating motion of the rubbing boards imparts an oscillating motion to the fruit while being propelled down the incline by the ruffled strips 37. These combined motions result in constantly changing the axis about which the fruit rotates so that it is thoroughly cleaned on all sides. This enables the machine to clean even the stem end of very flat fruit such as tangerines or flat grapefruit. The fruit emerge on an inclined runway 43 at the delivery end of the machine.

The pressure of the rotary brushes on the fruit is adjusted by changing the angular inclination of the rubbing boards 5. The more nearly vertical the rubbing boards are, the greater will be the pressure. Hence the adjustment of the machine for delicate fruit such as tangerines and soft or over-ripe oranges should be with maximum slope of the rubbing boards, while for grapefruit the adjustment should be nearly vertical. For firm round oranges it is sometimes desirable to leave the rubbing boards in the grapefruit adjustment.

It will be seen that the entire machine is readily accessible for adjustment and replacement of parts, and for observation while in operation. The rotary brushes may be removed from the machine by setting the rubbing boards in a vertical position and lifting the brush shafts out of their bearings.

The rotary brush and the rubbing board may be of any suitable construction and may have any kind of rubbing surfaces desired in place of the bristles and fabric covering described. Various other changes may also be made in the machine without departing from the invention as defined in the claims.

The invention claimed is:

1. A fruit cleaning machine comprising a rotary brush, a rubbing board having its lower edge adjacent said brush and parallel to the axis thereof, means for rotating said brush toward said rubbing board, and means for reciprocating said rubbing board in a straight line while maintaining its lower edge a uniform distance from the surface of said brush.

2. A fruit cleaning machine comprising a rotary brush, a rubbing board having its lower edge adjacent said brush and parallel to the axis thereof and having a rubbing surface cooperating with said brush to form a runway for the fruit, means for rotating said brush toward the rubbing surface of said rubbing board, and means for reciprocating said rubbing board in a straight line while maintaining its lower edge a uniform distance from the surface of said brush.

3. A fruit cleaning machine comprising a rotary brush, an inclined rubbing board having its lower edge adjacent and parallel to said brush, means for rotating said brush toward said rubbing board, means for reciprocating said rubbing board in a straight line while maintaining its lower edge a uniform distance from the surface of said brush, and means for adjusting the angular inclination of said rubbing board with respect to said brush.

4. A fruit cleaning machine comprising a rotary brush, an inclined rubbing board having its lower edge adjacent and parallel to said brush, means for rotating said brush toward said rubbing board, means for reciprocating said rubbing board in a straight line with its lower edge parallel to said brush, means for raising and lowering said rubbing board, and means for adjusting the angular inclination of said rubbing board with respect to said brush.

5. A fruit cleaning machine comprising a rotary brush, a shaft mounted adjacent and parallel to said brush, a rubbing board slidably mounted on said shaft and having its lower edge adjacent and parallel to said brush, and means for rotating said brush and reciprocating said rubbing board.

6. A fruit cleaning machine comprising a rotary brush, a shaft mounted adjacent and parallel to said brush, a rubbing board slidably mounted on said shaft and having its lower edge adjacent and parallel to said brush, means for rotating said brush and reciprocating said rubbing board, and means for raising and lowering said shaft to adjust the position of said rubbing board with respect to said brush.

7. A fruit cleaning machine comprising a rotary brush, a shaft mounted adjacent and parallel to said brush, an inclined rubbing board pivoted on said shaft and mounted to slide thereon with its lower edge adjacent and parallel to said brush, means for rotating said brush and reciprocating said rubbing board, and means for adjusting the angle of said rubbing board about its pivot.

8. A fruit cleaning machine comprising a rotary brush, a shaft mounted adjacent and parallel to said brush, a plurality of sleeves slidably mounted on said shaft, an inclined rubbing board pivoted on said sleeves with its lower edge adjacent and parallel to said brush, means preventing relative longitudinal movement between said rubbing board and sleeves, means for rotating said brush and reciprocating said rubbing board, means for raising and lowering said shaft to adjust said rubbing board toward and away from said brush, and means for adjusting the angular position of said rubbing board about its pivots.

9. In a fruit cleaning machine, the combination with a rotary brush and an adjacent inclined rubbing board forming a runway for the fruit, of a mounting for said rubbing board comprising a shaft adjacent and parallel to said brush, bearings slidable on said shaft, hangers attached at intervals to said rubbing board having collars swiveled on said bearings and projections extending above said collars, adjusting screws in said bearings cooperating with said projections to adjust the angular inclination of said rubbing board, and means for rotating said brush and reciprocating said rubbing board.

10. A fruit cleaning machine comprising a pair of spaced rotary brushes mounted in parallel relation, a shaft mounted between and parallel to said brushes, a pair of rubbing boards slidably mounted on said shaft and having their lower edges adjacent and parallel to the respective brushes forming runways for the fruit, and means for both rotating said brushes and reciprocating said rubbing boards.

11. A fruit cleaning machine comprising a pair of spaced rotary brushes mounted in a parallel relation, a shaft mounted between and parallel to said brushes, a pair of inclined rubbing boards slidably mounted on said shaft overhanging the respective brushes forming runways for the fruit, means for rotating said brushes and reciprocating said rubbing boards, means for raising and lowering said shaft to adjust the vertical position of said rubbing boards, and means for separately adjusting the angular inclination of said rubbing boards with respect to said brushes.

12. In a fruit cleaning machine, the combination with a pair of spaced rotary brushes mounted in parallel relation, a pair of inclined rubbing boards adjacent and overhanging the respective brushes, and means for rotating said brushes toward said rubbing boards, of a mounting for said rubbing boards comprising a shaft mounted between and parallel to said brushes, a plurality of sleeves slidably mounted on said shaft, hangers swiveled on said sleeves and supporting said rubbing boards, means for adjusting the angular inclination of said rubbing boards, and means for reciprocating said rubbing boards in unison.

13. In a fruit cleaning machine, the combination with a pair of spaced rotary brushes mounted in parallel relation, a pair of inclined rubbing boards adjacent and overhanging the respective brushes, and means for rotating said brushes toward said rubbing boards, of a mounting for said rubbing boards comprising a shaft mounted between and parallel to said brushes, a plurality of sleeves slidably mounted on said shaft, hangers attached to said rubbing boards having collars swiveled on said sleeves and projections extending above said collars, yokes on said sleeves straddling said collars, adjusting screws in said yokes cooperating with said projections to adjust the angular inclination of said rubbing boards, means preventing relative longitudinal movement between the yokes and collars on said sleeves, and means for reciprocating said rubbing boards.

14. In a fruit cleaning machine, the combination with a pair of spaced rotary brushes mounted in parallel relation, a pair of inclined rubbing boards adjacent and overhanging the respective brushes, and means for rotating said brushes toward said rubbing boards, of a mounting for said rubbing boards comprising a pair of shafts mounted one above the other between and parallel to said brushes, sleeves slidably mounted on each shaft adjacent opposite ends thereof, hangers adjacent opposite ends of each rubbing board having collars swiveled on the sleeves of one shaft, yokes coupling the sleeves of one shaft to the sleeves of the other shaft and straddling the collars of said hangers, means for reciprocating one of said yokes, and an adjustable wedge on such yoke forcing said collars apart and against the sides of the yoke.

15. In a fruit cleaning machine, the combination with a pair of spaced rotary brushes mounted in parallel relation, a pair of inclined rubbing boards adjacent and overhanging the respective brushes, and means for rotating said brushes toward said rubbing boards, of a mounting for said rubbing boards comprising a pair of shafts mounted one above the other between and parallel to said brushes, sleeves slidably mounted on each shaft adjacent opposite ends thereof, hangers adjacent opposite ends of each rubbing board having collars swiveled on the sleeves of one shaft, yokes coupling the sleeves of one shaft to the sleeves of the other shaft and straddling the collars of said hangers, means for reciprocating one of said yokes, means for holding the collars of the hangers against such yoke to take up the slack between them, and an adjusting screw on the other yoke acting on one of the adjacent collars to prevent movement of the yoke with respect to such collars.

Signed at Dunedin in the county of Pinellas and State of Florida, this 14th day of March, A. D. 1929.

BRONSON C. SKINNER.